United States Patent
Lorantfy et al.

(10) Patent No.: US 11,794,129 B2
(45) Date of Patent: Oct. 24, 2023

(54) EXTRACTION CELL FOR A CENTRIFUGAL PARTITION CHROMATOGRAPH, A CENTRIFUGAL PARTITION CHROMATOGRAPH CONTAINING SUCH A CELL, AND A METHOD FOR PRODUCING SUCH AN EXTRACTION CELL

(71) Applicant: ROTACHROM TECHNOLOGIAI KFT., Dabas (HU)

(72) Inventors: Laszlo Lorantfy, Dabas (HU); Laszlo Nemeth, Dabas (HU)

(73) Assignee: ROTACHROM TECHNOLOGIAI KFT., Dabas (HU)

( * ) Notice: Subject to any disclaimer, the term of this patent is extended or adjusted under 35 U.S.C. 154(b) by 757 days.

(21) Appl. No.: 15/756,739

(22) PCT Filed: Sep. 13, 2016

(86) PCT No.: PCT/HU2016/050042
§ 371 (c)(1),
(2) Date: Mar. 1, 2018

(87) PCT Pub. No.: WO2017/037489
PCT Pub. Date: Mar. 9, 2017

(65) Prior Publication Data
US 2018/0280830 A1    Oct. 4, 2018

(30) Foreign Application Priority Data
Sep. 1, 2015    (HU) .................................... 1500393

(51) Int. Cl.
*B01D 15/18*    (2006.01)
*G01N 30/42*    (2006.01)
*B01D 15/22*    (2006.01)
*G01N 30/02*    (2006.01)

(52) U.S. Cl.
CPC .......... *B01D 15/1892* (2013.01); *B01D 15/22* (2013.01); *G01N 30/42* (2013.01); *G01N 2030/027* (2013.01)

(58) Field of Classification Search
None
See application file for complete search history.

(56) References Cited

U.S. PATENT DOCUMENTS

| | | | |
|---|---|---|---|
| 3,853,765 | A | 12/1974 | Tanimura et al. |
| 4,422,941 | A | 12/1983 | Vaughan, Jr. et al. |

(Continued)

FOREIGN PATENT DOCUMENTS

| | | |
|---|---|---|
| CH | 655577 A5 | 4/1986 |
| CN | 202631489 U | 12/2012 |
| FR | 2883770 A1 | 10/2006 |

OTHER PUBLICATIONS

International Search Report dated Feb. 7, 2017 issued in corresponding PCT/HU2016/050042 application (5 pages).

(Continued)

*Primary Examiner* — Kara M Peo
(74) *Attorney, Agent, or Firm* — MILLEN, WHITE, ZELANO & BRANIGAN, PC; Ryan Pool (57) ABSTRACT

An extraction cell (10) for a centrifugal partition chromatograph (20), which extraction cell (10) contains an extraction chamber (12) delimited by a cell wall (12*c*) and accommodates the liquid stationary phase (30*á*), and it has a liquid inlet opening (13*b*) and a liquid outlet opening (13*k*) serving to let in and out the liquid mobile phase (30*m*) to be made to flow through the extraction cell (10). The extraction cell (10) contains an extraction chamber (12) established as a tubular body, and a liquid inlet plug (16*b*) that includes a liquid inlet opening (13*b*) and a liquid outlet plug (16*k*) that includes a liquid outlet opening (13*k*), that can be attached to the extraction chamber (12) and an insert (14) through (Continued)

which liquids may pass is positioned in the extraction chamber (12) between the liquid inlet opening (13*b*) and the liquid outlet opening (13*k*). A further objective relates to a centrifugal partition chromatograph (20) containing such an extraction cell (10), and a method for providing such an extraction cell (10).

19 Claims, 4 Drawing Sheets

(56) References Cited

U.S. PATENT DOCUMENTS 5,385,707 A * 1/1995 Miltenyi ............... B03C 1/034
209/213

2004/0173534 A1  9/2004 Margraff et al.

OTHER PUBLICATIONS

English Abstract of CH 655577 A5 published Apr. 30, 1986.
English Abstract of FR 2883770 A1 published Oct. 6, 2006.
English Abstract of CN 202631489 U published Dec. 26, 2012.
R. Margraff et al., "Partitron 25, A Multi-Purpose Industrial Centrifugal Partition Chromatograph: Rotor Design and Preliminary Results on Efficiency and Stationary Phase Retention", Journal of Liquid Chromatography & Related Technologies, vol. 28, No. 12-13 (2005) pp. 1893-1902.
L. Marchal et al., "Mass Transport and Flow Regimes in Centrifugal Partition Chromatography", AIChE Journal, vol. 48, No. 8 (Aug. 2002) pp. 1692-1704.

* cited by examiner

EXTRACTION CELL FOR A CENTRIFUGAL PARTITION CHROMATOGRAPH, A CENTRIFUGAL PARTITION CHROMATOGRAPH CONTAINING SUCH A CELL, AND A METHOD FOR PRODUCING SUCH AN EXTRACTION CELL

The object of the present invention relates to an extraction cell for a centrifugal partition chromatograph, which extraction cell contains an extraction chamber delimited by cell walls, and has a liquid inlet opening and a liquid outlet opening, and an insert through which liquids may pass is positioned in the extraction chamber between the liquid inlet opening and the liquid outlet opening.

The object of the invention also relates to a centrifugal partition chromatograph containing such an extraction cell.

The object of the invention also relates to a method for providing such an extraction cell.

Chromatography is the collective name for mixture separation methods based on multistage, high-efficiency, quasi-balance processes, which today, among separation technology processes, has become one of the most frequently used analytical methods. The fields of application include pharmaceutical analysis, foodstuff industry, toxicology and environmental analysis tests.

The basis of the procedure is that the components in a mixture to be separated are distributed in different proportions between a stationary phase and a mobile phase (eluent) flowing through the stationary phase in a specific direction. Using this method the molecules, ions of the components may be selectively separated from each other from solutions with complex compositions. Separation is made possible by that the individual components travel at different speeds while the mobile phase is flowing. This speed depends on the degree of interaction between the component and the stationary phase. Therefore, the components of the mixture travel at different speeds because their distribution between the stationary phase and the mobile phase, in other words their partition coefficient is different.

Figure 1A:
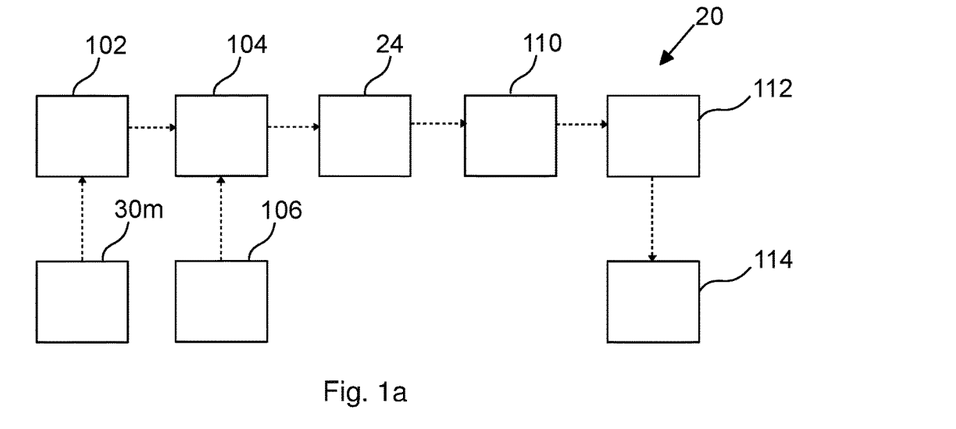
FIG. 1a shows an outline block diagram of an exemplary embodiment of a centrifugal partition chromatograph.

During centrifugal partition chromatography the liquid stationary phase is kept in place by a strong centrifugal field. In this technique, as seen in the block diagram in FIG. 1a, the chromatograph contains a liquid pumping system 102 serving for feeding the mobile phase 30m, a sample feed unit 104 serving for feeding the mixture material 106 to be separated, a rotor 24 that rotates around an axis, a detector 110 and fraction collection system 112. A product 114 leaves the system as the final result of the separation process, which preferably contains a single component of the mixture 106. In the rotor 24 a network of serially connected extraction cells 10 connected to each other by connection tubes 18 ensuring liquid connection rotates around the axis of the rotor 24. The separation process takes place in the cascade of series-connected extraction cells containing an inlet and an outlet opening, which are rotated around a common axis at a given speed. As a result of the pumping the mobile phase enters the cell containing the stationary phase through the inlet opening and breaks up into tiny droplets. The resultant of the centrifugal force and the buoyancy will be exerted on the tiny droplets of the mobile phase, due to which the droplets will flow through the stationary phase. The two phases come into contact with each other over a large surface area within the cell. Near to the outlet opening the two phases are separated from each other and the mobile phase leaves the cell.

Figure 1B:
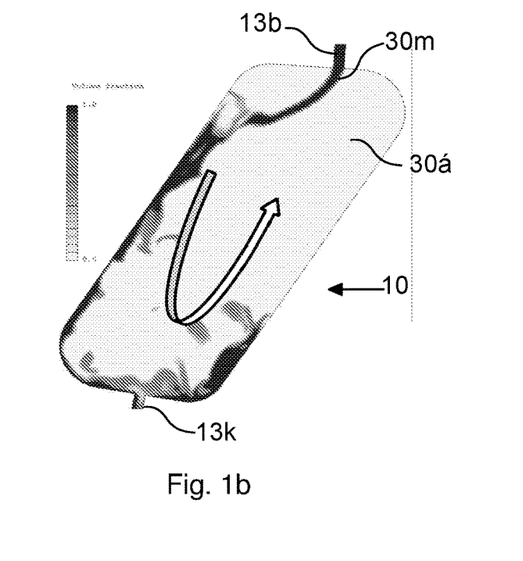
FIG. 1b is a simulated image of the liquid flow in an extraction cell not containing an insert, which illustrates the damaging remixing effect of the Coriolis force in the cell.

Coriolis force appears in the reference frame of the cells due to the rotation, as a result of which the path of the mobile phase is diverted. Using liquid simulation methods it can be demonstrated that the Coriolis force reduces the efficiency of the mixing of the two phases, as the diverted droplets run down the sidewall, so reducing the contact interface. The Coriolis force causes circular flow and remixing in the cell, which is a strongly degrading factor from the point of view of separation (see FIG. 1b).

Various methods may be found in the literature for the production of extraction cells. The Partitron centrifugal partition chromatograph protected by the patent with registration number U.S. Pat. No. 6,913,692 consists of a titanium cylinder, in which the extraction cells and the channels connecting them are produced by milling. A special CNC milling machine is required as the device is milled inside and outside from a single titanium alloy cylinder. The titanium alloy used is very expensive and during machining a large part of the cylinder goes to waste. Therefore the manufacturing of the device is expensive and results in a great deal of waste. The milled channels and cells are connected by covering plates, with flat seals being used between them. The material of the flat seals according to the specification is fluoroelastomer (Viton), which, however, does not tolerate the organic solvents used for cleaning the device well. When they come into contact with these they swell, soften and their sealing ability lessens.

Patent document with registration number U.S. Pat. No. 4,968,428 presents a stacked plate chromatograph in which the network of cells and channels is machined into a stainless steel plate. Teflon sealing plates are to be found between the stainless steel plates, which are punctured at the locations where flow is to take place between the plates. The greatest disadvantage of the arrangement is that the ratio of the useful volume as compared to the total mass of the device is very low, and the machining is expensive, as a great deal of waste is produced during machining. A further disadvantage of the plate arrangement is that due to the Teflon seals used its pressure resistance is low, and after time the Teflon plates become deformed, so reducing pressure tightness. In order to perfectly clean the device it must be completely disassembled, which is complicated and only possible with a press.

The aim of the invention is to provide an extraction cell, a centrifugal partition chromatograph containing such an extraction cell and a method for the production of such an extraction cell that is free of the disadvantages of the solutions according to the state of the art, in other words to be able to provide an extraction cell at a low cost in which the effect of the Coriolis force occurring may be effectively reduced. The aim of the invention is also to provide an extraction cell which may be manufactured so as to cause less waste than the solutions according to the state of the art.

The invention is based on the recognition that the extraction cell may be produced with the help of a tubular body shaped extraction chamber, and a liquid inlet plug and liquid outlet plug connected to its ends, during the production of which less waste is produced and the ratio of useful internal volume/mass is much greater as compared to the solutions according to the state of the art. It was also recognised that an insert that liquid may flow through may be placed in the extraction cell, which effectively reduces the undesirable circular flow in the cell caused by Coriolis force, and the liquid jet of the mobile phase entering the cell more effectively breaks up into droplets upon hitting the insert, due to which the interface between the two phases increases.

The task was solved in the sense of the invention with the extraction cell according to claim 1.

The task set for the invention was also solved with the centrifugal partition chromatograph according to claim 12.

Individual preferable embodiments of the invention are specified in the dependent claims.

The details of the invention are presented in connection with embodiments, with the help of drawings. In the appended drawings FIG. 6b depicts a lateral cross-section of a preferable embodiment of the truncated cone element according to FIG. 6a, FIG. 7 depicts a longitudinal cross-section of another preferable embodiment of the liquid outlet plug according to the invention.

Figure 2A:
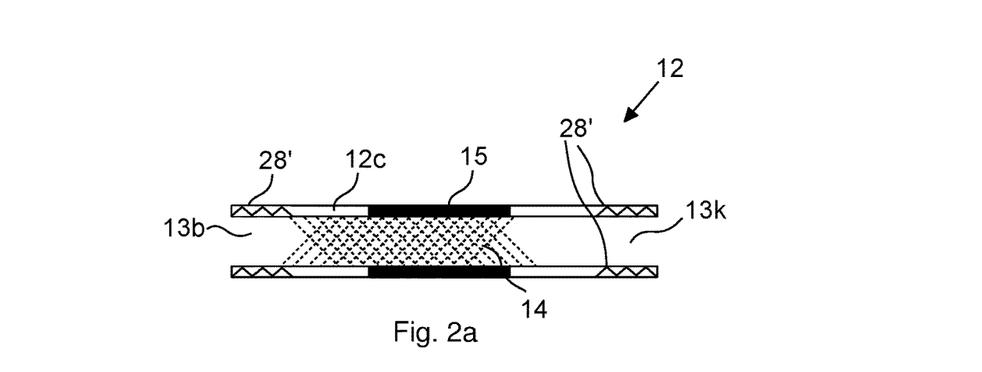
FIG. 2a depicts an outline longitudinal cross-section image illustrating a preferable embodiment of the tubular shaped extraction chamber of the extraction cell according to the invention.
Figure 2B:
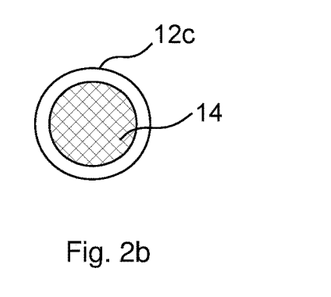
FIG. 2b depicts an outline lateral cross-section image of the tubular shaped extraction chamber of the extraction cell according to FIG. 2a, FIG. 3 is a simulated image of the liquid flow in an extraction cell containing the insert according to the invention.

FIGS. 2a and 2b show outline longitudinal and lateral cross-sections illustrating a preferable embodiment of the tubular shaped extraction chamber 12 of the extraction cell 10 according to the invention.

The extraction cell 10 contains an extraction chamber 12 delimited by a cell wall 12c and accommodating the liquid stationary phase 30á, and on its opposing sides it has a liquid inlet opening 13b and a liquid outlet opening 13k serving to let in and out the liquid mobile phase 30m to be made to flow through the extraction cell 10. The material of the cell wall 12c delimiting the extraction chamber 12 is preferably stainless steel, but other materials are also conceivable, such as titanium alloy, aluminium, PEEK (polyether ether ketone), Teflon, etc.

In the case of a preferable embodiment the extraction chamber 12 is constructed as a tubular body. This embodiment of the extraction chamber 12 is preferably produced using a waste-free production technology, such as 3D printing or injection moulding or metal casting. PEEK is preferably used in 3D printing, but naturally other materials may also be used, as is known to a person skilled in the art.

An insert 14 through which liquid may pass is positioned in the extraction chamber 12 according to the invention between the liquid inlet opening 13b and the liquid outlet opening 13k. In the context of the present invention an insert 14 through which liquid may pass means an insert that has internal passages via which liquids are capable of flowing through the insert 14. The average diameter of the internal passages of the insert 14, in other words the average diameter of their cross-section is 1-30 times, more preferably 1-20 times, and even more preferably 4-10 times the average diameter of the mobile phase 30m droplets created when the mobile phase 30m is made to flow in the stationary phase 30á. The cross-section of the internal passages is not necessarily circular. They may be square, rectangular, triangular or any other irregular plane figure. In this case average diameter may be viewed as the diameter of a circle with an area equal to that of the area of the plane figure.

In the case of a preferable embodiment the insert 14 contains one or more elements that liquid may pass through chosen from the following group: wound up net made from metal wire, fibrous woven textile, glass wool, steel wool, although other materials may also be used as is obvious for a person skilled in the art. In a given case the insert 14 may be fixed to the cell wall 12c, for example, by gluing, soldering, welding or by other mechanical fixing process. In the case of another exemplary embodiment the liquid inlet opening 13b and the liquid outlet opening 13k are dimensioned so that the insert cannot pass through, and due to this it is not necessary to fix the insert 14 within the extraction chamber 12.

With respect to its structure the insert 14 may have an irregular structure (glass wool, steel wool), a regular structure (metal wire, metal grid), or be a bulk insert. The latter may be realised by using a granulate, spheres, and/or other granular materials.

In the case of an especially preferable embodiment, with the extraction cell 10 in its position in the centrifugal partition chromatograph 20, the insert 14 is selected so as to reduce the effect of the Coriolis force occurring in the extraction cell 10 when in operation.

While providing the insert 14 through which liquid may pass, the extraction cell 10 is filled with liquid stationary phase 30á, then liquid mobile phase 30m is made to flow through the stationary phase 30a in such a way that the mobile phase 30m breaks up into droplets when it penetrates the stationary phase 30á. Following this the average diameter of the droplets of the mobile phase 30m penetrating the stationary phase 30á and breaking up into droplets is determined. This may take place, for example, by experiment, on the basis of an image recorded of the inside of the extraction cell, or theoretically, with the help of formulae. In a given case the droplets may also have an irregular shape, in this case the diameter of a droplet may be defined as having the same diameter as sphere with the same volume as the droplet. In the case of a preferable embodiment the average diameter of the droplets of the mobile phase is determined on the basis of the Stokes' law. During this the droplets inside the extraction cell 10 are considered to be spherical, the average diameter d of which may be calculated, with good approximation, using the following formula:

$$d = \frac{9 * v * \eta}{2 * \Delta\rho * \omega * \omega * R}$$

where v is the velocity of the mobile phase 30*m* penetrating the stationary phase 30*á* as compared to the stationary phase 30*á*, η is the viscosity of the stationary phase 30*á*, Δρ is the absolute value of the difference in density between the stationary phase 30*á* and the mobile phase 30*m*, ω is the angular velocity of the rotation of the extraction cell 10, and R is the distance of the extraction cell 10 from the axis of rotation. Naturally other relationships may be used to calculate the average diameter of the droplets apart from the above formula, as is obvious to a person skilled in the art.

By using the information obtained about the average diameter of the droplets, an insert 14 through which liquid may pass is provided that has internal passages, and the average diameter of the passages is 1-30 times, preferably 1-20 times, even more preferably 4-10 times the average diameter of the droplets.

In the case of a preferable embodiment an insert 14 is provided of a size so that its volume is 1-30%, preferably 1-20%, even more preferably 2-20% of the volume of the extraction cell 10. The volume that the insert 14 fills in the context of the present invention is the ratio of the net volume of the insert 14 and the internal volume of the extraction cell 10, where the net volume of the insert 14 is equal to that volume of liquid a completely immersed insert 14 would push out of a completely filled vessel.

The insert 14 presented above may be produced, for example, from a wound up net of metal wire, fibrous woven textile, glass wool, steel wool and from similar products, or a combination of them.

As a result of the effect of the insert 14 the circular flow of the liquid mobile phase 30*m* entering the extraction chamber 12 is reduced, as due to its viscosity a large amount of force is required for its to pass through the internal passages of the insert 14, which represent a braking resistance to the flow. This braking resistance is always opposite to the direction of movement of the liquid, and its extent is comparable to, or in a given case greater than, the extent of the Coriolis force occurring in the extraction cell 10, and in this way it reduces or completely extinguishes its effect. As the mobile phase 30*m* is driven by the difference between the centrifugal force and the buoyancy, which resultant force is greater than the Coriolis force, the mobile phase 30*m* entering the liquid inlet opening 13*b* can continue to flow through the extraction chamber 12 all the way to the liquid outlet opening 13*k*, through which it leaves the extraction chamber 12 (see FIG. 3).

Figure 3:
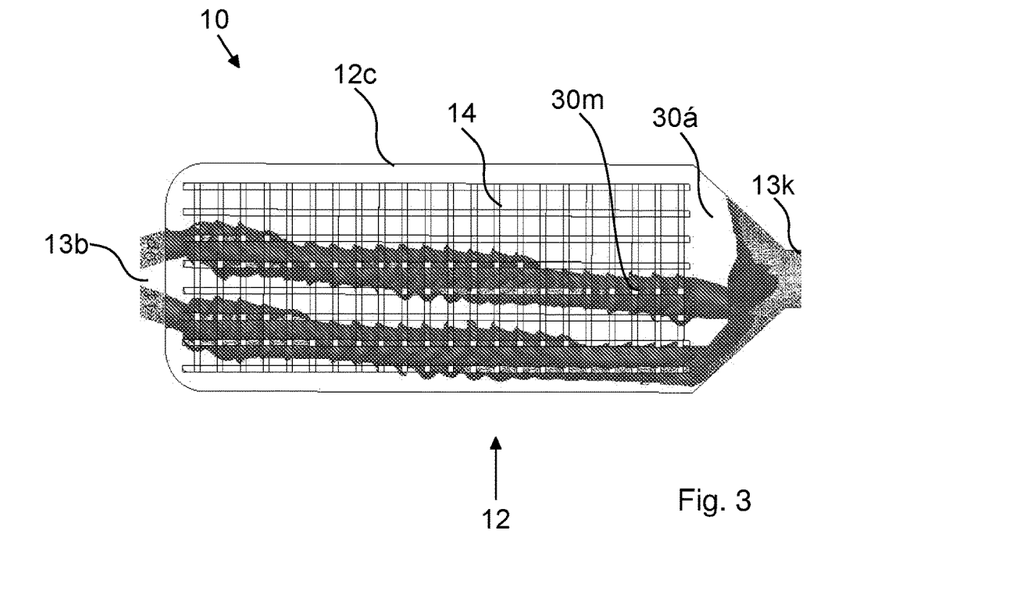

A further preferred characteristic of the insert 14 is that the liquid jet of the mobile phase 30*m* entering the extraction chamber 12 filled with stationary phase 30*á* more effectively breaks up into droplets when hitting the insert 14, and significantly ripples after passing through the insert 14. Due to this effect the mixing between the mobile phase 30*m* and the stationary phase 30*á* improves, and the transfer surface between the two liquids increases.

In the case of a preferable embodiment one or more pits 15 ensuring the securing of the extraction cell 10 to the external supporting structure 22 (see FIG. 8) are established on the external surface of the cell wall 12*c* of the extraction chamber 12.

Figure 4A:
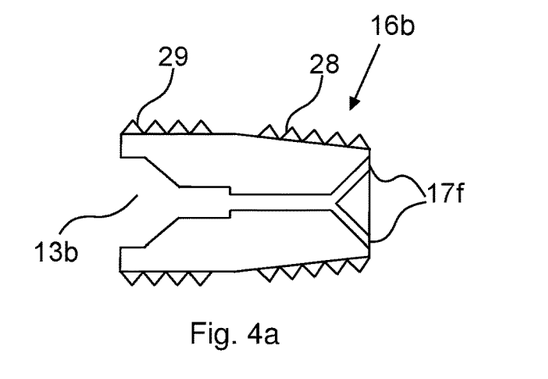
FIG. 4a depicts a longitudinal cross-section of a preferable embodiment of the liquid inlet plug according to the invention.
Figure 4B:
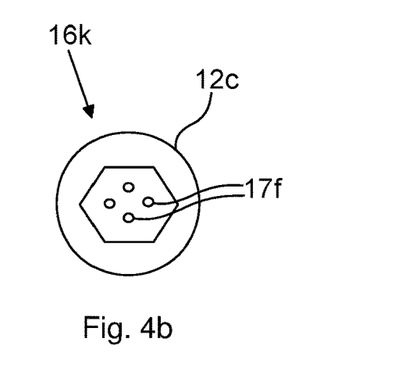
FIG. 4b depicts a lateral cross-section of a preferable embodiment of the liquid inlet plug according to FIG. 4a, FIG. 5a depicts a longitudinal cross-section of a preferable embodiment of the liquid outlet plug according to the invention.
Figure 5A:
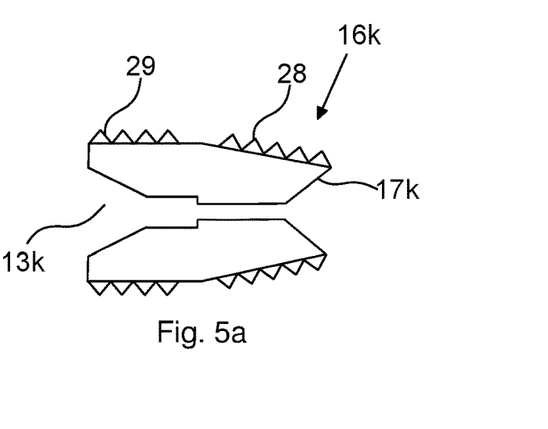
Figure 5B:
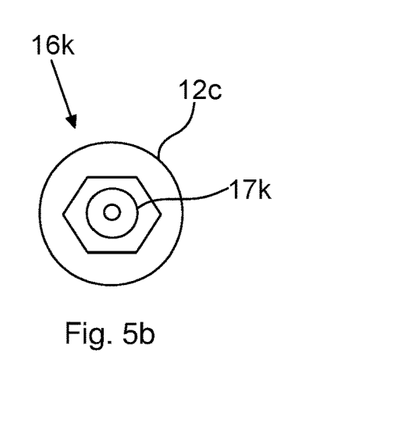
FIG. 5b depicts a lateral cross-section of the liquid outlet plug according to FIG. 5a, FIG. 6a depicts a longitudinal cross-section of another preferable embodiment of the liquid inlet plug according to the invention.

In the case of an especially preferable embodiment the extraction cell 10 can be attached to the extraction chamber 12, it contains the liquid inlet plug 16*b* according to FIGS. 4*a* and 4*b* which includes in it the liquid inlet opening 13*b* and the liquid outlet plug 16*k* according to FIGS. 5*a* and 5*b* which includes in it the liquid outlet opening 13*k*. In this case the liquid inlet opening 13*b* is established in the inlet plug 16*b*, and the liquid outlet opening 13*k* is established in the liquid outlet plug 16*k*. The liquid inlet plug 16*b* and/or the liquid outlet plug 16*k* are fixed to the cell wall 12*c* of the extraction chamber 12 preferably with a releasable connection, such as a screw thread. Naturally other releasable fixing methods (such as clasp fixing), or non-releasable fixing methods (such as welding, soldering, gluing, riveting, etc.) may be used, as is known to a person skilled in the art.

In a given case, an embodiment may be conceived in the case of which the liquid inlet opening 13*b* is established in the liquid inlet plug 16*b* and the liquid outlet opening 13*k* is established in the cell wall 12*c*, or vice versa, in other words the liquid outlet opening 13*k* is established in the liquid outlet plug 16*k* and the liquid inlet opening 13*b* is established in the cell wall 12*c*. The liquid inlet plug 16*b* and the liquid outlet plug 16*k* are preferably made from one or more of the following list of materials: stainless steel, titanium alloy, aluminium, PEEK, Teflon. The liquid inlet plug 16*b* and the liquid outlet plug 16*k* may also be made using one of the previously presented waste-free production technologies, and/or using other material working technologies (such as milling, grinding, drilling, etc.).

The longitudinal and lateral cross-sections of a liquid inlet plug 16*b* that consists of a single part can be seen in FIGS. 4*a* and 4*b*. In the case of a preferable embodiment the inlet plug 16*b* leading the mobile phase 30*m* into the extraction chamber 12 is established as a cylindrical body, on the side of which facing the internal space of the extraction chamber 12 there is a thread 28 formed on the outside, such as an external NPT(F) ⅜" thread. In the case of this embodiment the extraction chamber 12 is established in the form of a tubular body, and at least at the one end of the tube on the internal surface there is also a thread 28' established, such as an NPT(F) ⅜" thread, into which the NPT(F) ⅜" thread 28 of the inlet plug 16*b* may be screwed. An external thread 29 is established at the other end of the inlet plug 16*b*, such as a 5/16-20 UN thread. Preferably a hexagonal nut formation may be found between the NPT(F) ⅜" and the 5/16-20 UN threads 28, 29, which when held with a standard fork spanner the thread 28 of the inlet plug 16*b* may be easily driven into the thread 28' of the extraction chamber 12.

In the case of a preferable embodiment the liquid inlet opening 13*b* of the inlet plug 16*b* contains one or more slanted bores 17*f* that divides the liquid flowing through it into several liquid jets (see FIGS. 4*a* and 4*b*). In the case of an exemplary embodiment the diameters of the bores 17*f* are between 0.1 mm and 1 mm, but naturally different diameters may also be conceived. The role of the bores 17*f* is to divide the jet of mobile phase 30*m* liquid into several parts and to spray it evenly into the extraction chamber 12. The division may take place into any optional number of branches, however, when producing the bores it is preferable if the following aspects are taken into consideration:

when divided the flowing liquid should be divided in equal proportions, the liquid flowing in the various bores should take equally long paths.

According to liquid simulation tests dividing the mobile phase 30*m* into several liquid jets has a positive effect on the flow pattern, as atomisation is improved, or, in other words, the interface between the two phases increases, which is especially desirable from a chromatography point of view.

In the case of an exemplary embodiment the outlet plug 16*k* is also tubular, which, however, preferably contains a single branched liquid outlet opening 13*k*, and conical machining 17*k* is formed on its side facing the internal space of the extraction chamber 12 (see FIGS. 5*a* and 5*b*).

Similarly to the inlet plug 16b, on the side of the outlet plug 16k facing the internal space of the extraction chamber 12 there is an external thread 28 formed on the outside, such as an NPT(F) ⅜" thread, and on the other side there is an external thread 29 formed on the outside, such as a 5/16-20 UN thread. The outlet plug 16k may also be fixed into the thread 28' of the extraction chamber 12 using the external NPT(F) ⅜" thread 28. The connection tube 18 visible in FIG. 9 may be connected to the external 5/16-20 UN thread 29 of the inlet plug 16b and outlet plug 16k, with the help of which a liquid connection may be realised between the liquid outlet opening 13k of an extraction cell 10 and the liquid inlet opening 13b of another extraction cell 10 connected in series with it.

The purpose of the conical machining 17k is for the droplets of the mobile phase breaking up into droplets which pass through the extraction chamber 12 to easily combine, and due to this only the mobile phase 30m leaves through the liquid outlet opening 13k.

Figures 6A, 6B, 7:
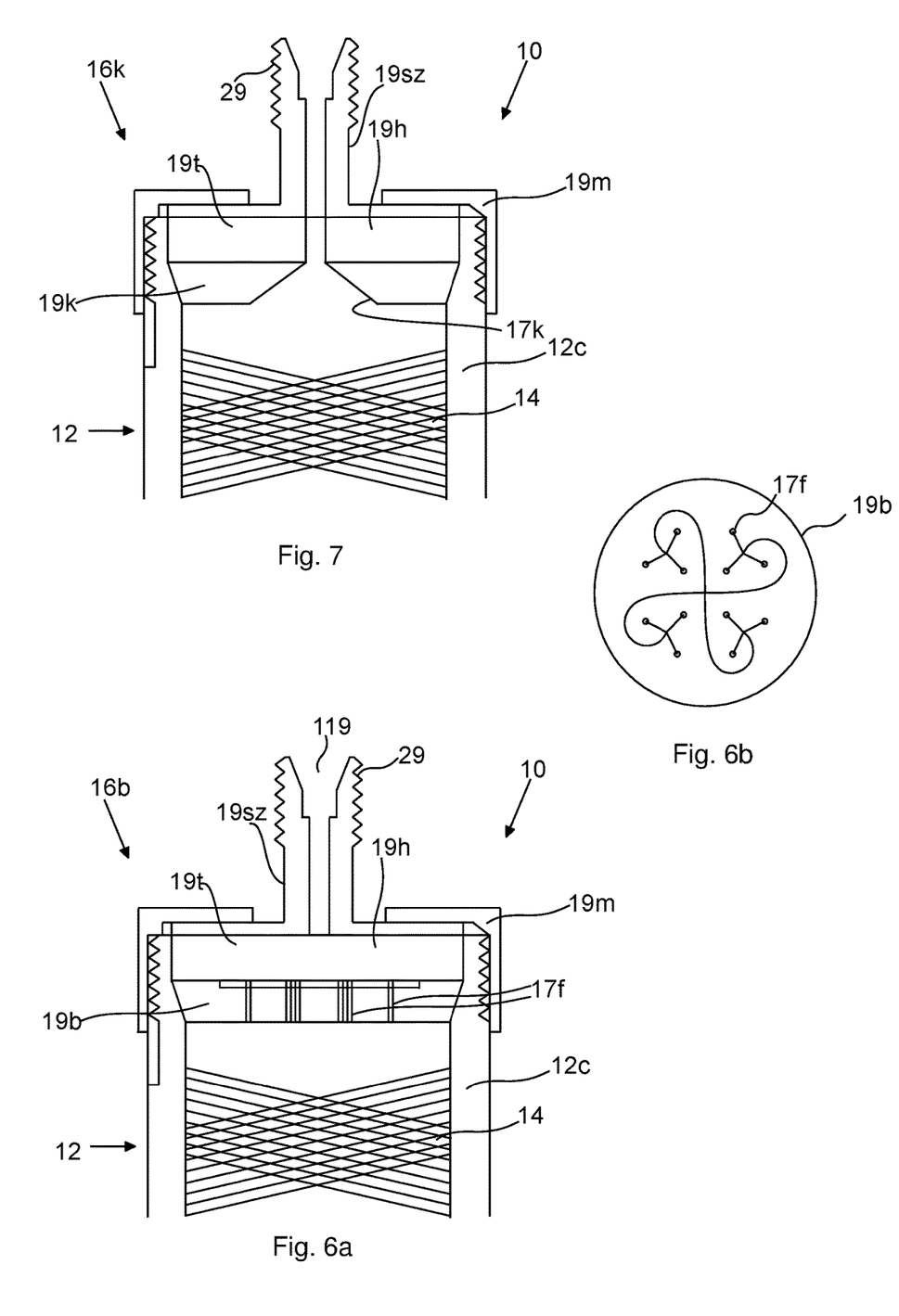

In the case the extraction chamber 12 has a larger tube diameter, the liquid inlet plug 16b and/or the liquid outlet plug 16k are constructed from several parts that may be separated from each other, as can be seen in FIGS. 6a and 7. In the case of this embodiment the liquid inlet plug 16b contains an inlet truncated cone element 19b responsible for the division of the liquid jet of the mobile phase 30m and for sealing, a cylindrical body 19h fitted to it, and a threaded cap 19m fixing the cylindrical body 19h to the extraction chamber 12. The material of the inlet truncated cone element 19b is preferably PEEK, but apart from this it may be made of Teflon, HDPE or other material that is easily machined. The cylindrical body 19h is preferably made from ANSI 316 stainless steel, but it may also be from titanium alloy, aluminium, PEEK, Teflon, etc., as is obvious for a person skilled in the art.

In the case of a preferable embodiment four branches are formed by milling in the inlet truncated cone element 19b, and three bores 17f branch off each branch, as can be seen in FIG. 6b. Therefore, there are a total of twelve bores 17f located in the inlet truncated cone element 19b, through which the mobile phase 30m gets into the extraction chamber 12 after being evenly divided. A section of internal surface of the cell wall 12c at the side towards the liquid inlet opening 13b is etched, which is followed by a conically shaped machined section into which the inlet truncated cone element 19b fits so as to form a seal.

The cylindrical body 19h contains a base part 19t that is drilled through in the centre and fits into the internal machining of the extraction chamber 12 and a hollow stem 19sz fixed to the base part 19t, as can be seen in FIG. 6a. The inside of the stem 19sz includes a 45 degree conical part 119 and a 6.45 mm depression, a thread 27 is preferably formed on its exterior surface, such as a 7/16-20 UNC thread, with the help of which the connection tube 18 may be fixed to the stem 19sz.

In the case of this embodiment a fine M60x3 metric thread is formed on the external surface of the cell wall 12c, at both ends of the cylindrical body shaped extraction chamber 12, onto which the threaded cap 19m may be screwed. The edge of the threaded cap 19m screwed onto the extraction chamber 12 fixes the inlet truncated cone element 19b and the cylindrical body 19h located in the extraction chamber 12. The material of the threaded cap 19m is preferably strong steel.

An embodiment is also conceivable in which the inlet truncated cone element 19b and the cylindrical body 19h are fixed to the extraction chamber 12 with the thread formed on the external surface of the cylindrical body 19h and the thread formed on the internal surface of the cell wall 12c. In this case it is unnecessary to use a threaded cap 19m. The screwing in of the cylindrical body 19h preferably takes place using the hexagonal nut formation established on the cylindrical body.

The construction of the liquid outlet plug 16k according to FIG. 7 differs from that presented above to the extent that instead of an inlet truncated cone 19b it contains an outlet truncated cone 19k, on which a single branch liquid outlet opening 13k and conical machining 17k facing towards the internal space of the extraction chamber 12 are formed.

Figure 8:
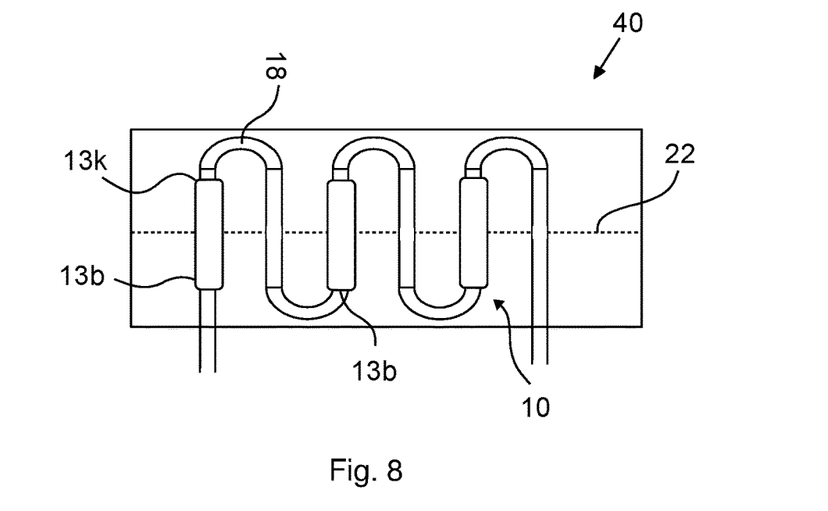
FIG. 8 depicts a schematic image of a module containing the extraction cells according to the invention.

FIG. 8 illustrates a module 40 of a rotor 24 according to the invention, which contains several extraction cells 10 connected in series with connection tubes 18. In the case of this embodiment the module 40 also includes in itself the supporting structure 22 that fixes the extraction cells 10 to the module 40. The module 40 is preferably fixed to the rotor 24 in a releasable way, such as by using screws. The supporting structure 22 is preferably of high strength and has a light, grid-like or net-like structure. The supporting structure 22 may be constructed from, for example, metal, metal alloy, plastic, other composite, etc., as is obvious for a person skilled in the art. The extraction chamber 12 is fixed to the supporting structure 22 using one or more pits 15 formed in the external surface of the cell wall 12c, preferably in a releasable way. Naturally, the extraction cells 10 may be fixed to the supporting structure 22 in other releasable or non-releasable ways, apart from the fixing with the pits 15.

Figure 9:
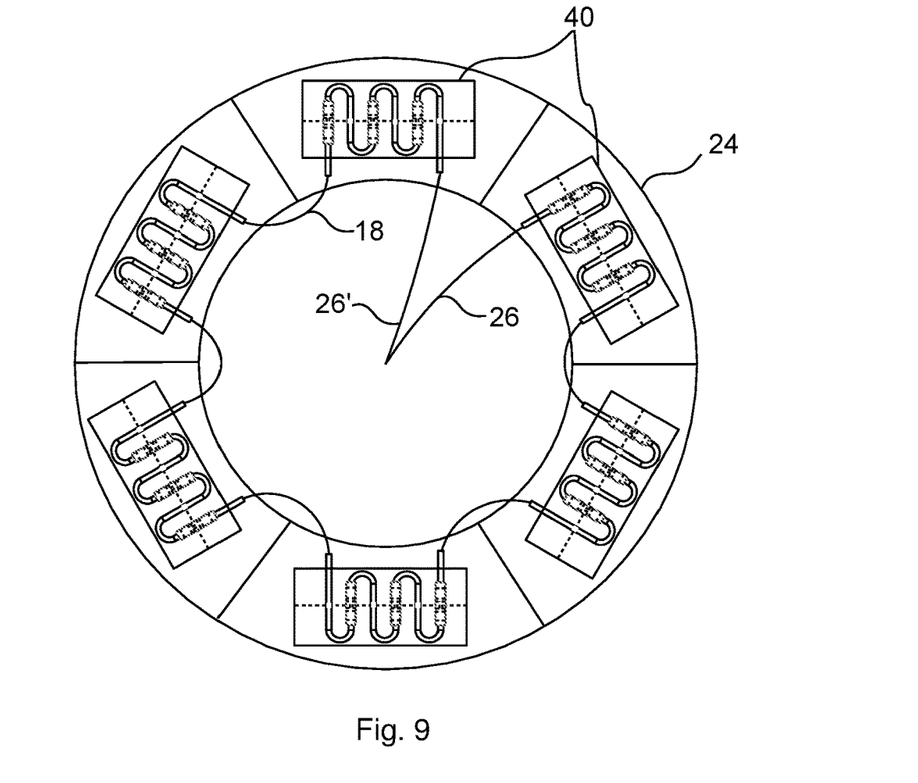
FIG. 9 depicts a schematic image of a rotor containing the module presented in FIG. 9.

FIG. 9 illustrates a disc rotor 24 with an annular cross-section constructed using the modules 40 presented in FIG. 8. This embodiment of the centrifugal partition chromatograph 20 has a modular structure made up of substantially identical modules, in the case of which each of the modules 40 contains one or more extraction cells 10 connected with connection tubes 18 ensuring a liquid connection between them.

Around the circumference of the rotor 24 the modules 40 are connected in series with connection tubes 18 in such a way that the liquid input of a selected module 40 is preferably connected to the liquid input at the main axis of the rotor 24 through a feed tube 26, while the liquid output of the neighbouring module 40 is preferably connected to the liquid output at the main axis of the rotor 24 through a discharge tube 26'.

In the following the operation of the extraction cell according to the invention and of the centrifugal partition chromatograph 20 containing the extraction cell 10 is presented.

Before separation the extraction cells 10 are at least partially filled with liquid stationary phase 30á, then the rotation of the rotor 24 along with the extraction cells 10 is started. Following this the pumping of the mobile phase 30m through the series-connected extraction cells 10 is started and as a consequence of the rotation centrifugal force occurs in them. This centrifugal force immobilises the stationary phase 30á, in other words it keeps the stationary phase 30á in the cells. Subsequently, the mixture to be separated is added to the mobile phase 30m with the sample input unit, preferably in impulse-like doses.

The direction of the pumping is selected as follows depending on the relationship between the densities of the stationary phase 30á and the mobile phase 30m:

if the stationary phase 30á is the denser phase (ascendant mode), then the mobile phase 30m is made to flow in the direction of the axis of rotation of the rotor 24;

if the stationary phase 30á is the less dense phase (descendent mode), then the mobile phase 30m is made to flow from the centre of rotation in the direction of the rotational circumference.

Due to the pumping the mobile phase 30m enters the extraction cell 10 via the liquid inlet opening 13b, then breaks up into tiny droplets in the stationary phase 30á. In an ideal case the distribution of the droplets is homogenous inside the extraction chamber 12. The insert 14 placed in the extraction chamber 12 further improves the homogenisation.

Coriolis force is created in the extraction cells 10 of the rotating rotor 24 as a result of the rotation, which endeavours to displace the flow of the mobile phase 30m entering the extraction chamber 12 in the sideways direction. The insert 14 exerts resistance with respect to the flow, which resistance is comparable to the extent of the Coriolis force, thereby significantly reducing its effect. As the difference between the centrifugal force and the buoyancy is exerted on the mobile phase 30m, which resultant force is greater than the Coriolis force, the mobile phase 30m entering through the liquid inlet opening 13b is able to flow through the extraction chamber 12 containing the insert 14. In an ideal case the two phases are in contact with each other from the liquid inlet opening 13b all the way to the liquid outlet opening 13k. The mobile phase 30m and the stationary phase 30á become separated in the proximity of the liquid outlet opening 13k due to the conical machining 17k and the effect of the difference in density between the two phases. The phase with lower density is driven by buoyancy towards the liquid inlet opening 13b, while the denser phase continues to be moved towards the liquid outlet opening 13k due to the greater centrifugal force being exerted on it. In an ideal case only the mobile phase leaves the extraction cell 10. The processes presented above are carried out and repeated in each of the series-connected cells 10. If the mixture to be separated is added to the mobile phase 30m (preferably intermittently), then the components characterised by different partition coefficients are separated from each other in the extraction cells 10.

In the case of a preferable embodiment several series-connected extractions cells 10 form modules 40 that may be individually removed from the centrifugal partition chromatograph 20. One of the greatest advantages of the modular construction is that in the case of a single extraction cell 10 becoming faulty (blocked, for example) the extraction cell 10 can be easily repaired or replaced, furthermore, the periodical cleaning of the extraction cells 10 is also simpler to perform. In the case of those embodiments in which the liquid inlet opening 13b and the liquid outlet opening 13k are formed in the inlet plug 16b and the outlet plug 16k, the cleaning of the extraction cells can be simply performed by unscrewing the plugs, as opposed to the solutions according to the state of the art, in which the entire device has to be dismantled to do this.

It is clear that alternative solutions will be apparent to a person skilled in the art as compared to the embodiments presented here, which, however, fall within the scope of protection determined by the claims.

The invention claimed is:

1. An extraction cell (10) for a centrifugal partition chromatograph (20), comprising an extraction chamber (12) delimited by a cell wall (12c) which extraction cell (10) is suitable for accommodating a liquid stationary phase (30ά), and has a liquid inlet opening (13b) and a liquid outlet opening (13k) serving to let in and out a liquid mobile phase (30m) to be made to flow through the extraction cell (10), which extraction cell (10) contains an extraction chamber (12) established as a tubular body, and a liquid inlet plug (16b) that includes a liquid inlet opening (13b) and a liquid outlet plug (16k) that includes a plurality of fluid delivery passages and a liquid outlet opening (13k), that can be attached to the extraction chamber (12), wherein an insert (14) through which liquids may pass is positioned in the extraction chamber (12) between the liquid inlet opening (13b) and the liquid outlet opening (13k), which has internal passages, and the average diameter of the internal passages is 1-30 times the average diameter of the liquid mobile phase (30m) droplets created when the liquid mobile phase (30m) is made to flow in the liquid stationary phase (30ά), wherein the insert (14) contains one or more components that liquid may pass through selected from the group consisting of fibrous woven textile, glass wool, and steel wool.

2. The extraction cell (10) according to claim 1, which has been made by a waste-free production technology.

3. The extraction cell (10) according to claim 1, wherein the insert (14) contains steel wool.

4. The extraction cell (10) according to claim 1, wherein the insert (14) has a porosity which is selected to reduce the effect of the Coriolis force occurring in the extraction cell (10) as a result of rotational movement of the extraction cell (10) when it is in the centrifugal partition chromatograph (20) in operation.

5. The extraction cell (10) according to claim 1, wherein the cell wall (12c) delimiting the extraction chamber (12) is made of one or more of stainless steel, titanium alloy, aluminium, PEEK, and Teflon.

6. The extraction cell (10) according to claim 1, wherein the liquid inlet plug (16b) and/or the liquid outlet plug (16k) are fixed to the cell wall (12c) of the extraction chamber (12) with a releasable connection.

7. The extraction cell (10) according to claim 1, wherein one or more pits (15) are present on an external surface of the cell wall (12c) of the extraction chamber (12) to ensure fixing of the extraction cell (10) to an external supporting structure (22).

8. The extraction cell (10) according to claim 1, wherein the liquid inlet plug (16b) contains more than one bore (17f) that divide a liquid made to flow through it into several liquid jets.

9. The extraction cell (10) according to claim 1, wherein the liquid inlet plug (16b) and/or the liquid outlet plug (16k) are constructed from several parts that may be separated from each other.

10. The extraction cell (10) according to claim 1, wherein the liquid inlet plug (16b) and the liquid outlet plug (16k) are made from one or more of stainless steel, titanium alloy, aluminium, PEEK, or Teflon.

11. The extraction cell (10) according to claim 1, wherein the average diameter of the passages is 4-10 times the average diameter of the liquid mobile phase (30m) droplets created when the liquid mobile phase (30m) is made to flow in the liquid stationary phase (30ά).

12. The extraction cell (10) according to claim 1, wherein the liquid inlet plug (16b) and/or the liquid outlet plug (16k) are fixed to the cell wall (12c) of the extraction chamber (12) with a releasable connection, which is a screw thread.

13. The extraction cell (10) according to claim 1, wherein the liquid inlet plug (16b) and/or the liquid outlet plug (16k) are fixed to the cell wall (12c) of the extraction chamber (12) with a releasable connection, which is a screw thread on a side of each of the inlet plug (16b) and/or the liquid outlet plug (16k).

14. The extraction cell (10) according to claim 1, wherein the average diameter of the liquid mobile phase (30m) droplets created when the liquid mobile phase (30m) is made to flow in the liquid stationary phase (30á) is determined on the basis of the following formula:

$$d = 9*v*\eta/2*\Delta\rho*\omega*\omega*R$$

wherein
d is the average diameter
v is the velocity of the liquid mobile phase (30m) penetrating the liquid stationary phase (30á) as compared to the liquid stationary phase (30á),
η is the viscosity of the liquid stationary phase (30á),
Δρ is the absolute value of the difference in density between the liquid stationary phase (30á) and the liquid mobile phase (30m),
ω is the angular velocity of the rotation of the extraction cell (10), and
R is the distance of the extraction cell (10) from the axis of rotation.

15. A centrifugal partition chromatograph (20), comprising at least one extraction cell (10) according to claim 1.

16. The centrifugal partition chromatograph (20) according to claim 15, which contains several extraction cells (10) that are connected in series with connection tubes (18) that ensure a liquid connection.

17. The centrifugal partition chromatograph (20) according to claim 16, wherein the several series-connected extraction cells (10) together form one removable module (40).

18. The centrifugal partition chromatograph (20) according to claim 17, which has a modular structure made up of substantially identical modules (40), where each of the modules (40) contains one or more extraction cells (10) connected with the connection tubes (18) ensuring a liquid connection between them, furthermore, the individual modules (40) are connected to each other in via the connection tubes (18).

19. A method for providing the extraction cell according to claim 1 that may be used in a centrifugal partition chromatograph (20), comprising
providing serially connected extraction cells (10) that are connected to each other by connection tubes (18),
filling the extraction cells (10) with the liquid stationary phase (30á),
making the liquid mobile phase (30m) flow through the liquid stationary phase (30á),
determining the average diameter of the droplets of the liquid mobile phase (30m) breaking up into droplets and penetrating the liquid stationary phase (300, and
arranging the insert (14) through which liquid may pass through in the extraction cell (10) that has internal passages, wherein the average diameter of the passages is 1-30 times the average diameter of the droplets.

* * * * *